(12) United States Patent
Lion et al.

(10) Patent No.: US 7,861,886 B2
(45) Date of Patent: Jan. 4, 2011

(54) BAKING SHEET

(75) Inventors: Mathieu Lion, Paris (FR); Lucas Bignon, Cachan (FR)

(73) Assignee: Mastrad SA, Paris (FR)

( * ) Notice: Subject to any disclaimer, the term of this patent is extended or adjusted under 35 U.S.C. 154(b) by 1141 days.

(21) Appl. No.: 11/157,747

(22) Filed: Jun. 21, 2005

(65) Prior Publication Data

US 2006/0000368 A1 Jan. 5, 2006

Related U.S. Application Data

(63) Continuation-in-part of application No. 10/883,348, filed on Jul. 1, 2004.

(51) Int. Cl.
*A47J 27/00* (2006.01)
*A47J 36/00* (2006.01)
*A22C 7/00* (2006.01)

(52) U.S. Cl. .................... 220/573.1; 220/573.2; 99/426

(58) Field of Classification Search ................. 220/9.1, 220/9.4, 475, 495.01, 495.03, 495.08; 383/112
See application file for complete search history.

(56) References Cited

U.S. PATENT DOCUMENTS

| | | | | |
|---|---|---|---|---|
| 3,804,965 | A * | 4/1974 | Peters | ......................... 426/523 |
| 3,962,961 | A | 6/1976 | Peters | |
| 4,565,468 | A | 1/1986 | Crawford | |
| 4,960,211 | A | 10/1990 | Bailey | |
| 5,209,957 | A * | 5/1993 | Lin | ........................... 428/34.7 |
| 5,232,609 | A | 8/1993 | Badinier et al. | |
| 5,503,062 | A * | 4/1996 | Buff, IV | ....................... 99/426 |
| 5,601,012 | A | 2/1997 | Ellner | |
| 5,968,577 | A | 10/1999 | Roecker | |
| 6,067,698 | A | 5/2000 | Silvera-Langley | |
| 6,279,771 | B1 | 8/2001 | Bryant | |
| 7,011,014 | B2 | 3/2006 | Siegel et al. | |
| 7,150,221 | B2 | 12/2006 | Morgan | |
| 2001/0004056 | A1* | 6/2001 | Sawyer | ........................ 206/503 |
| 2001/0043977 | A1 | 11/2001 | Llorente Hompanera | |
| 2002/0100372 | A1 | 8/2002 | Bryant et al. | |
| 2003/0192847 | A1 | 10/2003 | Jahrling et al. | |
| 2005/0000960 | A1* | 1/2005 | Bergeret | ...................... 219/732 |
| 2005/0056642 | A1* | 3/2005 | Lion | ......................... 220/4.22 |
| 2005/0082286 | A1 | 4/2005 | Nikkhah | |
| 2005/0199132 | A1 | 9/2005 | Meeks et al. | |

FOREIGN PATENT DOCUMENTS

| | | |
|---|---|---|
| DE | 003832524 | 3/1990 |
| EP | 000278055 | 8/1988 |
| GB | 002154860 | 9/1985 |
| JP | 000278055 | 8/1988 |
| JP | 02002264548 | 9/2002 |

* cited by examiner

*Primary Examiner*—Anthony Stashick
*Assistant Examiner*—Shawn M Braden
(74) *Attorney, Agent, or Firm*—Cowan, Liebowitz & Latman, P.C.; Mark Montague, Esq.

(57) ABSTRACT

A baking sheet having a substantially flat silicone cooking surface, two rods extending along and coupled to opposite sides of the cooking surface, and two thermo-resistant handles coupled to and extending between the two rods. The thermo-resistant handles may be connected to the rods using thermo-resistant connectors. The baking sheet may be rectangular, square, round or other shape. The handles and rods may be manufactured from various materials.

15 Claims, 8 Drawing Sheets

BAKING SHEET

RELATED APPLICATION

This application is a continuation-in-part of U.S. application Ser. No. 10/883,348, filed Jul. 1, 2004, the disclosure of which is incorporated herein by reference.

FIELD OF THE INVENTION

The present invention relates to a baking sheet and, more particularly, to a silicone baking sheet with removable thermo-resistant handles for easy handling and convenient storage.

BACKGROUND OF THE INVENTION

Baking sheets have long been widely and commonly used for supporting food products such as pre-baked food during the baking process. Patented designs include those disclosed in U.S. Pat. No. 6,279,771; and those in foreign Patents GB 2,154,860; EP 278055; DE 3832524.

Traditional baking sheets, however, pose handling problems after being exposed to high temperatures since they do not permit direct contact. In addition, with traditional baking sheets it is very difficult to place the sheet in an oven when it has cookie dough on it. In such case, the user generally must use a griddle or a metal tray. Many of the above references disclose enhanced baking sheets, for instance baking sheets adaptable to different widths, having an air pocket between the food product and the baking sheet, or eliminating the need for greasing the surface prior to baking. Nevertheless, there still is a need for a baking sheet enhanced to allow easy handling immediately following exposure to high temperatures as well as proper storage. There also is the need for a baking sheet that can be easily partially or completely removed from an oven for various purposes, such as to monitor baking status.

OBJECTS AND SUMMARY OF THE INVENTION

It is therefore an object of the present invention to provide a baking sheet enhanced for easy handling before, during and after exposure to high temperatures.

It is a further object of the present invention to provide a self-supported baking sheet allowing for quick disassembly and easy storage.

In accordance with the present invention, a baking sheet includes a silicone cooking surface, first and second support rods for supporting the silicone cooking surface, and first and second thermo-resistant handles coupled to the first and second support rods.

As a feature of the invention, the silicone cooking surface is substantially round in shape and each of the first and second support rods are curved and are disposed along different parts of a perimeter of the silicone cooking surface.

As a further feature of the invention, each of the first and second thermo-resistant handles are curved and coupled to the first and second rods so that each of the first and second handles extend along respective planes that are substantially perpendicular to a plane through which the silicone cooking surface extends.

As another feature of the invention, the silicone cooking surface includes a plurality of openings adapted to allow heat flow through the openings during heating of the baking sheet.

As an additional feature of the invention, the silicone cooking surface has a thickness that is sufficiently strong and sufficiently stretched between the first and second rods when the baking sheet is both cool and heated during food cooking conditions.

As yet a further feature of the invention, each of the first and second handles is manufactured from non-food grade material.

As yet an additional feature of the invention, each of the first and second handles is manufactured from non-food grade material with a silicone coating.

As still yet a further feature of the invention, the silicone cooking surface has a thickness of substantially between 0.5 mm and 2.0 mm.

As still yet another feature of the invention, the silicone cooking surface is intermixed with at least one of fiberglass threads and fiberglass fabric and reinforcement thermo resistant material.

As still yet an additional feature of the invention, the entire baking sheet is thermo resistant to a minimum of 180 Celsius.

In accordance with the present invention, a baking sheet includes a substantially round silicone cooking surface, first and second support rods for supporting the silicone cooking surface and disposed on substantially opposite ends of the round silicone cooking surface, and first and second thermo-resistant handles coupled to the first and second support rods.

As a feature of this baking sheet, each of the first and second support rods and the first and second handles provide sufficient structure to properly support and stretch the round silicone cooking surface.

As a further feature, the round silicone cooking surface is stretched sufficiently from the first and second support rods so as to remain sufficiently flat during use of the baking sheet.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

The present invention pertains to a novel baking sheet. As would be appreciated, the inventive baking sheet is intended for use by a layperson or a professional chef for the purpose of assisting in the baking of food products. Of course, the baking sheet may be utilized by other individuals for similar or different purposes.

Figure 1:
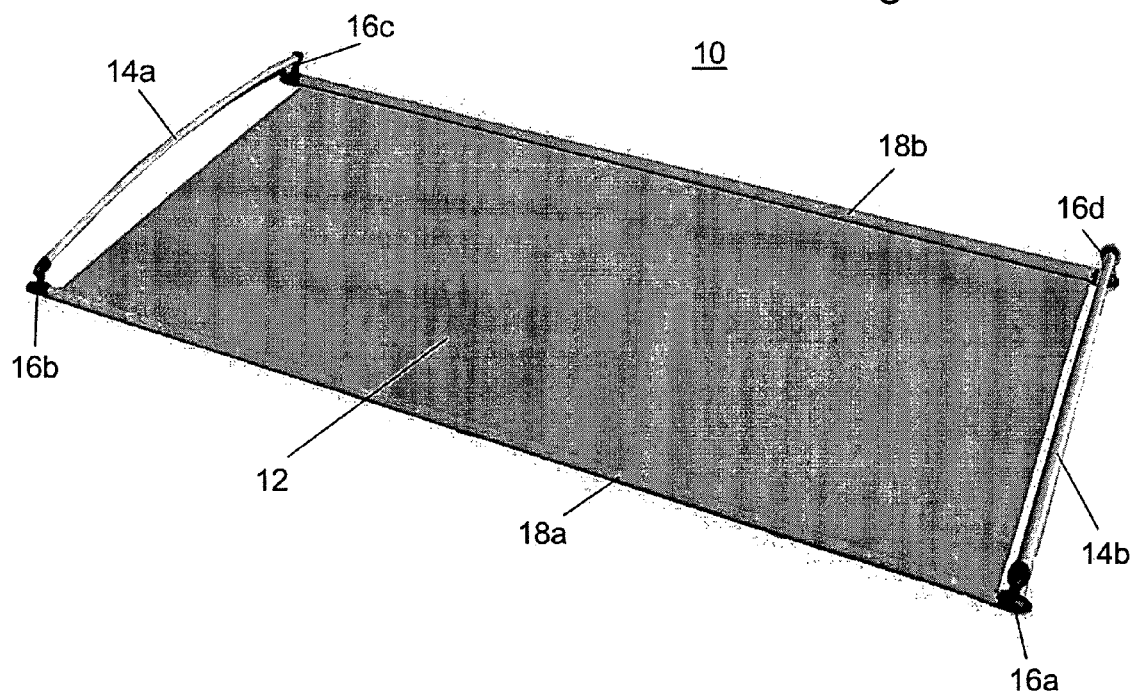
FIG. 1 is a schematic illustration of the baking sheet of the present invention.

Referring now to FIG. 1 of the drawings, the baking sheet 10 of the present invention includes a cooking surface 12 and a pair of handles 14a and 14b. Cooking surface 12 preferably is flat and made of silicone. However, cooking surface 12 may be made of other material, such as from a suitable metal sheet, coated or uncoated, appropriate for cooking functions. Handles 14a and 14b may be made of metal, but preferably are made of thermo-resistant material, so as to allow direct handling immediately after exposure to extreme temperatures, for example, after baking. Handles 14a and 14b may be completely straight or be slightly curved to provide tensile strength to the silicone sheet. Handles 14a and 14b are attached to the shorter sides of cooking surface 12 utilizing four sets of connectors 16a, 16b, 16c and 16d (an individual connector is sometimes referred to herein, for convenience, as connector 16).

Figure 2A:
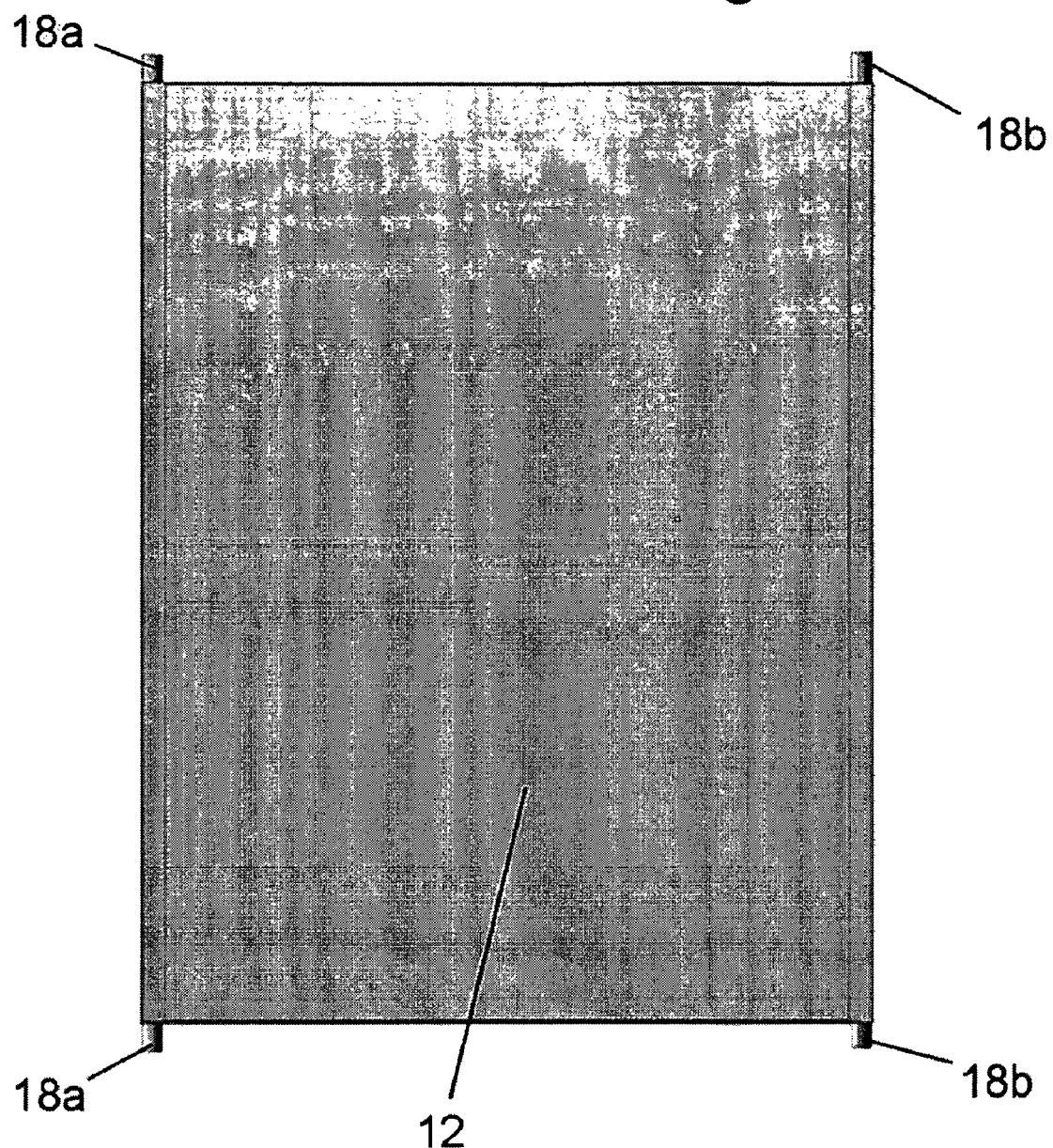
FIGS. 2a and 2b show different views of the baking sheet's cooking surface with attached rods.
Figure 2B:

Cooking surface 12 includes a pair of rods 18a and 18b, disposed along the longer sides, as shown in the respective top and side view drawings of FIGS. 2a and 2b. Rods 18a and 18b may be made of stainless steel or other appropriate material, but preferably are made of thermo-resistant material. In the preferred embodiment, cooking surface 12 is made of silicone and rods 18a and 18b are encircled within the silicone (see FIG. 2b) along the two longer surfaces of cooking surface 12. Rods 18a and 18b extend slightly beyond the encircled silicone and, as discussed further below, each connector 16 attaches a handle to an exposed end of a rod.

The structure of each connector 16 will be described with reference to FIGS. 3a, 3b and 3c of the drawings. As shown in FIG. 3a, each connector (16a, 16b, 16c and 16d shown in FIG. 1) is identified herein, for convenience, as a coupled element 20 (also called connector 20). Coupled element 20 is comprised of two components coupled to one another: connector component 22 and connector component 24 (or simply components 22 and 24). FIG. 3a shows components 22 and 24 coupled together. Components 22 and 24 may be disassembled from one another as further discussed below.

Figure 3B:
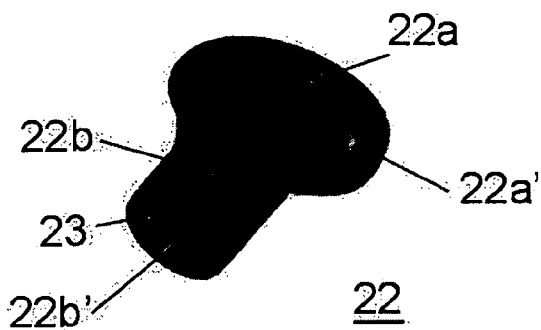
FIGS. 3a, 3b and 3c are schematic illustrations of the connector used to connect the handles to the baking sheet in accordance with the present invention.
Figure 3C:
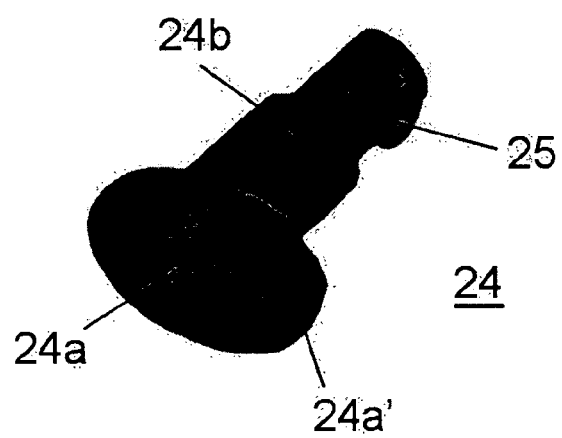
Figure 3A:
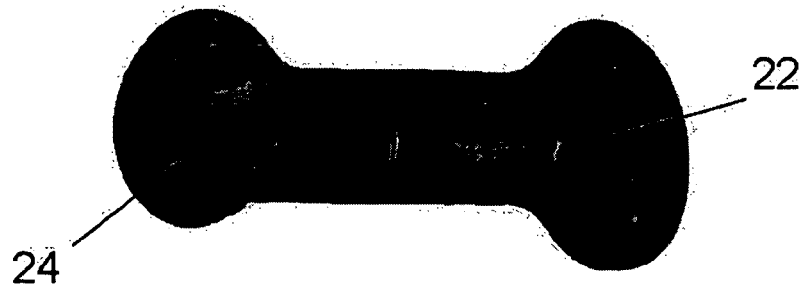

FIG. 3b shows component 22 alone and FIG. 3c shows component 24 alone. As shown in FIG. 3b, component 22 includes connection end 22a and connection end 22b. Connection end 22a (also called rod/handle connection end 22a) includes a round elongated inner core 22a' for receiving an end of one of the rods or an end of one of the handles. Connection end 22b (also called socket end 22b) includes a keyed, mostly round elongated inner core 22b' (with notch 23) and is designed to receive the counterpart connection end of the other connector component 24, discussed below. As shown, the apertures 22a' and 22b' within rod/handle connection end 22a and socket end 22b extend along longitudinal axes that are offset 90 degrees from one another.

Connector component 24 shown alone in FIG. 3c includes connection ends 24a and 24b. Connection end 24a (also called rod/handle connection end 24a) is similar to rod/handle connection end 22a and includes a round elongated inner core 24a' for receiving an end of one of the rods or an end of one of the handles. Connection end 24b (also called plug end 24b) is in the form of a keyed plug (with projection 25) that is designed to be insertable into socket end 22b. Plug end 24b extends outwardly from rod connection end 24a along an axis perpendicular the longitudinal axis of inner core 24a'.

Connector components 22 and 24 are coupled together by inserting plug end 24b of component 24 into socket end 22b of component 22. Since socket end 22b and plug end 24b are "keyed" by means of notch 23 and projection 25, as shown, the components cannot be coupled together in an incorrect manner. That is, the components can only be coupled together to produce the coupled connector configuration shown in FIG. 3a.

Figure 4B:
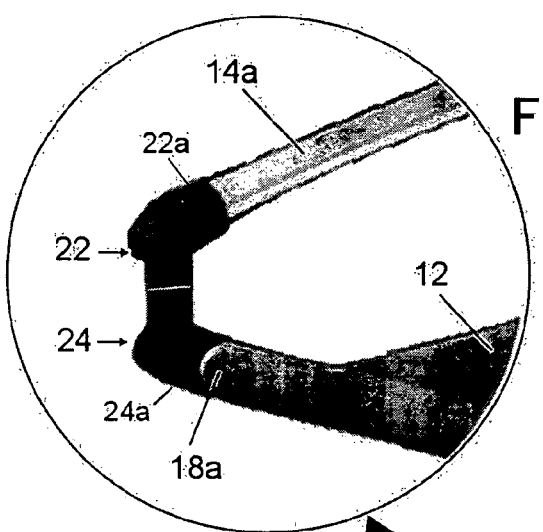
FIG. 4a shows part of the baking sheet of the present invention and FIG. 4b is an enlarged view showing one connector used to connect a handle in accordance with the present invention.
Figure 4A:
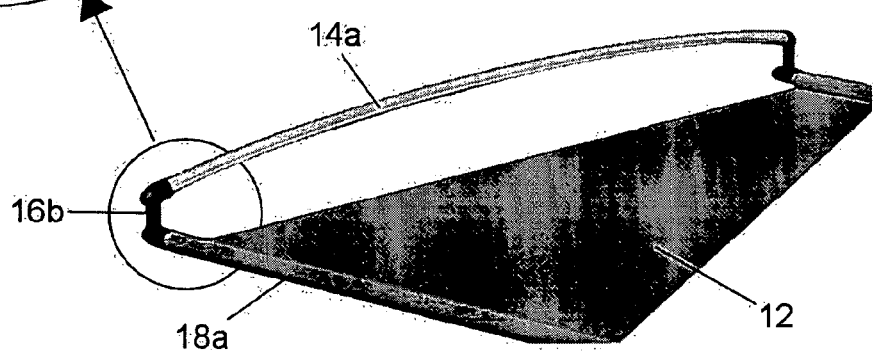

Baking sheet 10 of the present invention utilizes four of the connectors 20 shown in FIGS. 3a. As shown in FIG. 1, two connectors (16b and 16c) attach handle 14a to rods 18a and 18b, and two connectors (16a and 16d) attach handle 14b to the other ends of rods 18a and 18b. Referring to FIG. 4a, connector 16b (shown as connector components 22 and 24 in FIG. 4b) connects handle 14a to one end of rod 18a. As described above, connector 16b contains two rod/handle connection ends (22a and 24a) and, in the preferred embodiment, rod/handle connection ends 22a and 24a are reversible, that is, each end can be coupled to an end of a handle and each end can be coupled to a disposed end of a rod. In this preferred embodiment, the dimensions of the ends of both handles 14a and 14b and the ends of both rods 18a and 18b are the same to provide for the versatility of allowing either end of each connector to be coupled to either a handle or a rod. Of course, in a non-preferred embodiment, it is contemplated that the ends of the handles and the rods are of different thicknesses (or other dimensions, as appropriate) and thus connection ends 22a and 24a are designed accordingly and thus may not be interchangeable.

The other three connectors 20 couple respective ends of handles to rods in a like manner as that described above. As would be appreciated, connectors generally are first connected to the handles with the orientations of the longitudinal axes of the exposed inner cores aligned in the same direction before coupling the connectors to the rods. In a preferred embodiment, the dimensions of the handles, rods and inners cores are appropriately sized to enable a user to be able to connect and disconnect the various connections with only a small amount of force. However, the connections should be relatively secure so as to prevent unintended disconnection. For example, gravity alone (i.e., holding the baking sheet in a slanted or vertical orientation) should not cause disconnection of the handles from the rods.

In the preferred embodiment, as further discussed below, a user of the baking sheet 10 of the present invention is able to disassemble the various components for further benefit discussed below. In a non-preferred embodiment, the baking sheet of the present invention is manufactured to produce connections between the handles, connectors and rods that cannot be disassembled by users of the baking sheet.

In accordance with the present invention, the handles can be partially disconnected or fully disconnected from the rods by users of the inventive baking sheet for various beneficial purposes. In particular, after use of the baking sheet 10, one end of each handle 14a, 14b may be disconnected from the respective rods to which they are attached and then the handles may be rotated 90 degrees to place them alongside the longer sides of cooking surface 12 (partial disconnection) (i.e., the axes along which the handles extend are parallel to the axes along which the rods extend). To facilitate such rotation, core 22b' of socket end 22b of each connector (see FIG. 3b) is internally keyed to allow such 90 degree rotation. Since the particular internal design of the connector components to facilitate rotation is well within the capability of one of ordinary skill in the art, further description thereof is not provided. Thereafter, baking sheet 10 may be easily rolled or pushed into storage, as needed. It is appreciated that either end of the two handles may be removed and rotated by users.

To fully disconnect the handles from the cooking surface 12, all of the connectors 16a, 16b, 16c and 16d are removed from the rods to which they are connected. The connectors may then be removed from the attached handles. The connectors themselves may further be dissembled (see FIGS. 3a, 3b, 3c). After disassembly, all of the components may be properly cleaned and stored for later use. Moreover, based upon the intended usage, benefits and preferences of users, multiple variations are possible. For example, various interconnections between the handles and the connectors, or the connectors themselves, may be made permanent during manufacture. That is, the baking sheet of the present invention may be manufactured to allow users to not be able to fully disassemble all of the components, as discussed above. For example, the connectors may be made to prevent their disassembly. For example, the rods and/or handles can be permanently secured to the connectors, e.g., via welding, permanent adhesive or other known technique. In yet another variation, connectors are not utilized, wherein the handles and rods are permanently secured together in any known manner.

As shown in the side view drawing of cooking surface 12 shown in FIG. 2b, rods 18a and 18b are positioned and embedded within the silicone forming cooking surface 12 to provide a cooking surface that has a completely flat lower surface to maximize the area of contact between the cooking surface and an oven grid or plate. In a non-preferred variation, the rods may be maintained below the cooking surface so that only the silicone surrounding the rods contact a flat surface such as a table top after cooking. Moreover, the rods may be coupled to the cooking surface in other manners, such as by co-injection, adhesively secured, welded or other appropriate method. In yet another variation, the baking sheet may be made solely of silicone with a silicone frame provided around the sheet.

Figure 5:
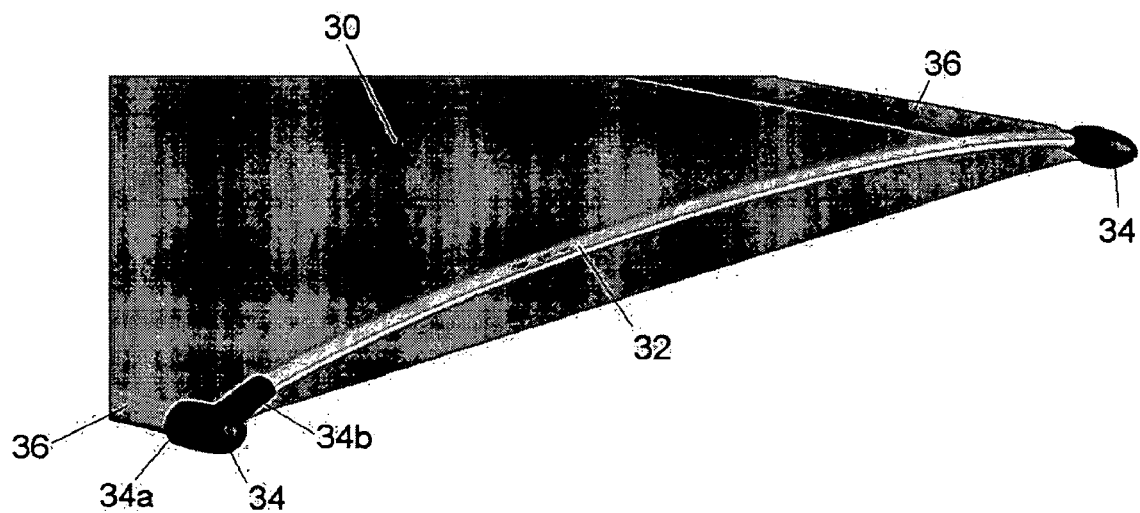
FIG. 5 is a schematic illustration of a portion of another baking sheet in accordance with the present invention.

FIG. 5 of the drawings shows a variation of the baking sheet in accordance with the present invention. Like the embodiment shown in FIGS. 1-4, the baking sheet in FIG. 5 includes a cooking surface 30, a pair of handles 32 (only one handle shown in FIG. 1), four connectors 34 (only two shown in FIG. 5) and a pair of rods 36. Each of these components has the same characteristics and features of the various components previously discussed, and may vary also as previously discussed. The embodiment shown in FIG. 5 differs, however, from the previously described embodiment in that each connector 34 is a single, unitary component with ends 34a and 34b for engagement with a respective end of a rod and a respective end of a handle. Each connector 34 provides for a fixed, that is, non-rotatable, engagement between a handle and rod. Each handle (with or without connectors 34) is removable from the cooking surface during use or storage of the baking sheet. Each handle 32 is curved as shown in FIG. 5 to maximize functionality and aesthetics. However, the curvature or shape of the handle may be different than that shown.

Figure 6A:
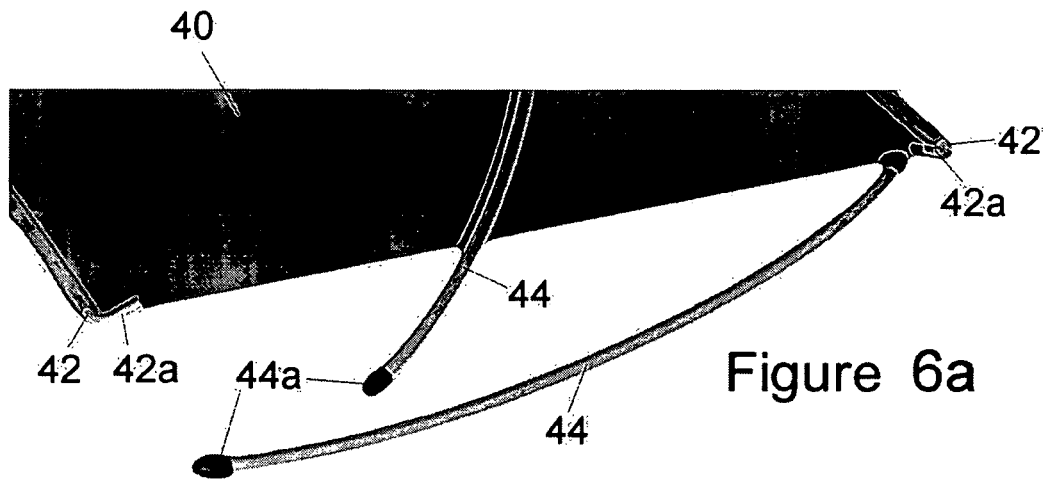
FIGS. 6a, 6b and 6c are schematic illustrations of yet a further baking sheet in accordance with the present invention.
Figure 6B:
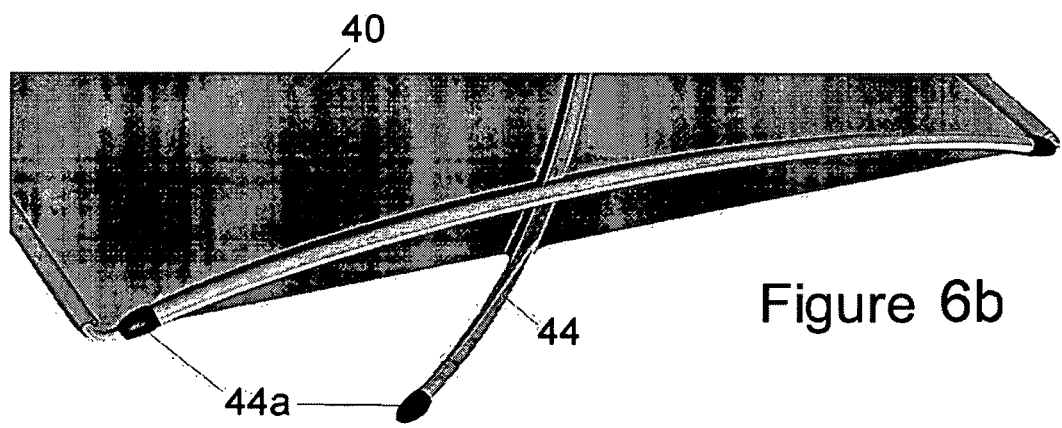
Figure 6C:
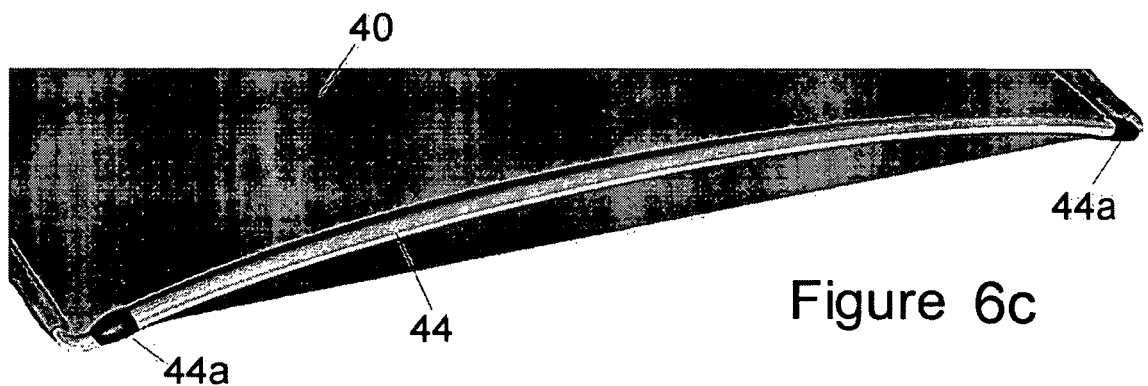

FIGS. 6a, 6b and 6c of the drawings show another variation of the baking sheet of the present invention. The baking sheet shown is similar to the previously discussed variations. However, in this exemplary version, rods 42 disposed within cooking surface 40 include a bent end 42a (bent at about a 90 degree angle; other angles are possible) utilized for connection with handles 44. Each handle 44 includes an end 44a made of rubber, plastic or other suitable material that receives bent end 42a. As shown, bent ends 42a are directed slightly upwards to enable easy connection to a handle. The handle and rods can be permanently secured to one another, for example, by welding. They also can be detachable. In the version shown, a stable handle construction is provided. In a variation, each handle can include a bent portion for connection to a non-bent end of a rod.

Figure 7B:
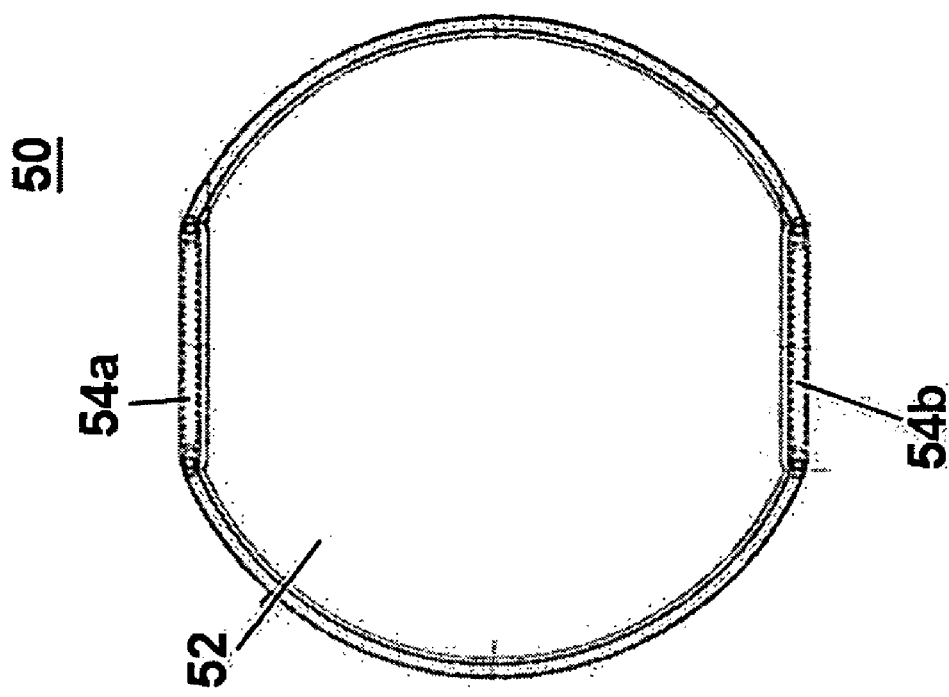
FIGS. 7a and 7b are schematic illustrations of the baking sheet in accordance with a further embodiment of the present invention.
Figure 7A:
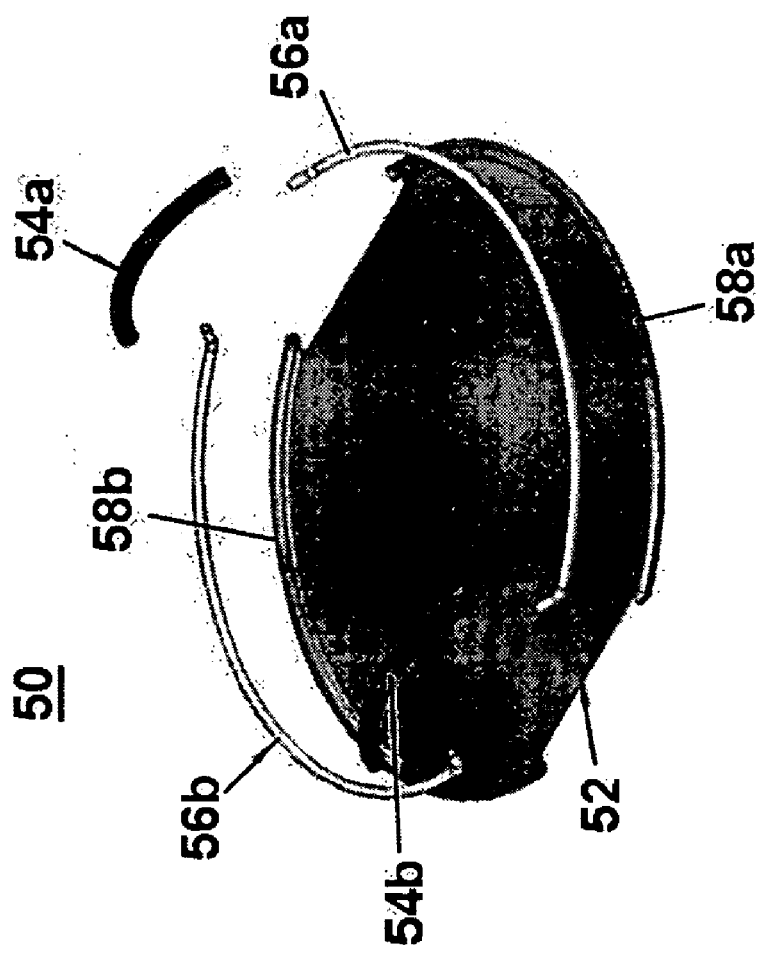

FIGS. 7a and 7b show a baking sheet 50 in accordance with another embodiment of the present invention. FIG. 7a is an exploded view of the baking sheet and FIG. 7b is a top view. As shown, baking sheet 50 includes a somewhat round cooking surface 52 and a pair of handles 54a and 54b. As shown, handles 54a and 54b are disposed above the plane of the cooking surface so as to not interfere with cooking and to be easily graspable during removal and insertion from and into an oven. Also, handles 54a and 54b are curved and extend upward from the cooking surface 54 so that each handle 54a and 54b is disposed within a plane that is substantially perpendicular to the plane through which the cooking surface 54 extends.

Cooking surface 12 preferably is flat and made of silicone, with the silicone having a preferred thickness of between 0.5 mm and 2.0 mm, with a 1.0 mm thickness working quite well to have the characteristics described herein. Handles 54a and 54b may be made of metal, but preferably are made of thermo-resistant material, so as to allow direct handling immediately after exposure to extreme temperatures, for example, after baking. In a particularly preferred version, handles 54a and 54b each includes a stainless steel tube with silicone molded over the tube. Handles 54a and 54b also preferably are curved, as shown, to provide tensile strength to the silicone sheet. Preferably, handles 54a and 54b have a diameter of between 3 and 12 mm and, more preferably, a diameter of between 5 and 8 mm.

Cooking surface 52 includes a pair of curved rods 56a and 56b, disposed along the perimeter of the curved surface. Rods 56a and 56b are encircled within the silicone along the perimeter areas 58a and 58b shown in FIG. 7a. Rods 58a and 58b extend slightly beyond the encircled silicone with the exposed ends coupled to handles 54a and 54b. The handles and rods are coupled together directly or by using the connectors previously discussed. The thicknesses and diameters of the cooking surface, handles and rods may vary than that disclosed herein and should be selected based upon the thickness and characteristics of the silicone.

Figure 8B:
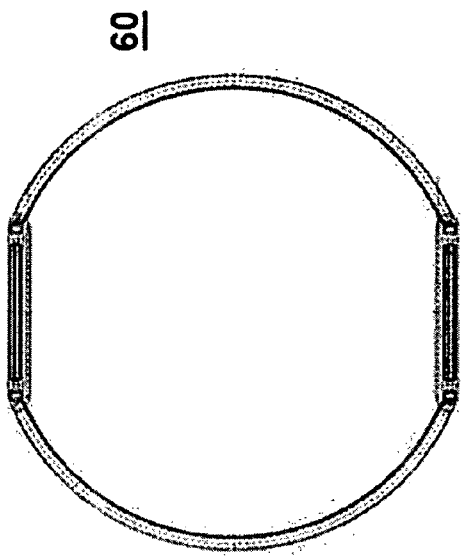
FIGS. 8a and 8b are schematic illustrations of the baking sheet in accordance with yet another embodiment of the present invention.
Figure 8A:
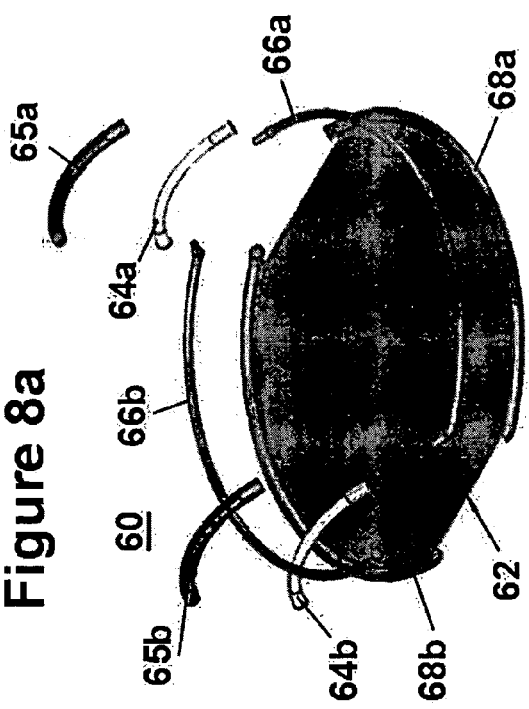

FIGS. 8a and 8b show an embodiment similar to the embodiment shown in FIGS. 7a and 7b. In FIGS. 8a and 8b, baking sheet 60 includes a rounded cooking surface 62, a pair of handles 64a and 64b made of HTN polyamide with silicone (65a and 65b) molded over the handles. Cooking surface 62 includes a pair of curved rods 66a and 66b, disposed along the perimeter of the curved surface. Rods 66a and 66b are encircled within the silicone along the perimeter areas 68a and 68b, and extend slightly beyond the encircled silicone with the exposed ends coupled to handles 64a and 64b.

The embodiments described above, and particularly the embodiments showing the round baking pans in FIGS. 7a-7b and 8a-8b are sized and have particular thicknesses and strengths to keep the silicone cooking surface firm or rigid both before and after cooking, and with or without, for example, a kilogram of dough or other item. The thicknesses of the silicone surface mentioned herein achieves these features, thus providing a cooking surface that is not too thick so that it is difficult or slow to heat up during the initial cooking process or that is not too thin thus resulting in a likelihood of failure (e.g., cracking, splitting, etc.). Moreover, the thickness and stretching of the silicone to form the cooking surface must be properly calculated to maintain sufficient tension and flatness of the silicone cooking surface during static conditions and also during heating (e.g., cooking) of the herein-described baking sheets.

Figure 9:
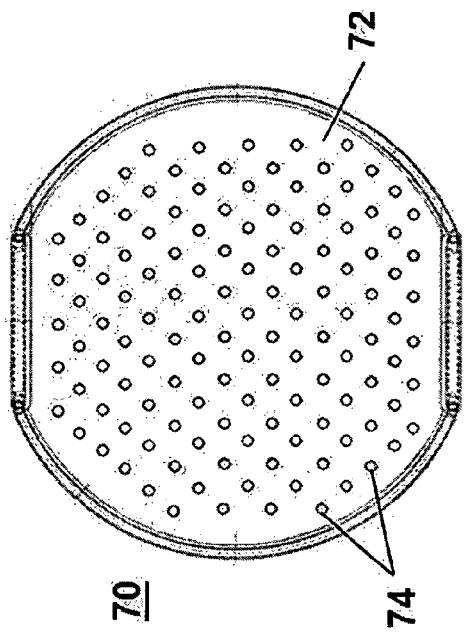
FIG. 9 is schematic illustration of the baking sheet in accordance with still yet another embodiment of the present invention.

In a variation of the embodiments described herein, such as shown in FIG. 9, baking sheet 70 has a silicone cooking surface 72 that includes openings or holes 74 disposed throughout the cooking surface 72 to improve heat transfer to the food product or other item disposed on the cooking surface. The size, shape and number of holes 74 may differ than that shown in FIG. 9. Also, the shape of the cooking surface with holes may be different, such as rectangular as in various previously described embodiments.

The various embodiments described may further include a non-stick coated silicone cooking surface, or a non-stick material, such as Teflon™ fiber, intermixed with the silicone cooking surface. Further, other materials can be mixed with silicone to produce the cooking surfaces described herein, including fiberglass threads. A non-silicone core with a silicone cooking surface or with a combined fiberglass silicone cooking surface may be used in the various embodiments described herein.

The silicone material of the cooking surface further can be replaced or lined or mixed with a suitable thermo resistant material, which has a sufficiently high tensile strength. The thermo resistant material preferably is thermo resistant to a minimum of 180 degrees Celsius and also preferably is a food contact safe type material. This includes but is not limited to fiberglass thread or fabric, High temperature Polyamide (high temp Nylon), steel thread or steel sheet, Teflon™ coating or mixing.

The handles and/or the rods described in the various embodiments may be designed to be slightly elastic. As discussed, insulating material may be provided within the handles and/or the rods.

In accordance with a further variation of the embodiments described herein, the handles may be manufactured from non-food grade thermo-insulating material. As shown in each of the drawings, the handles are disposed above the cooking surfaces and thus the raised handles are not part of the cooking surface. Accordingly, non-food grade thermo-insulating material may be utilized for the handles. Such non-food grade thermo-insulating material for the handles may be covered with silicone. For example, the handles may be wire covered with silicone, may be high temperature Polyamide (PA), or PA covered with silicone. In each of the variations, the PA may be reinforced with fiberglass.

The handles also may be manufactured from any those materials mentioned above or be made from a non food grade material as long as the handles have sufficient rigidity and tensile strength. Preferred materials are stainless steel, with or without a silicone covering, high temp nylon also with or without a silicone covering.

Similarly, the rods made be made from those materials mentioned above as long as they have enough resistance. Preferred rods materials are stainless steel, with or without a silicone covering, high temp nylon also with or without a silicone covering.

In another variation; the entire baking sheet is thermo resistant to a minimum of 180 Celsius.

While the present invention has been particularly shown and described in conjunction with preferred embodiments thereof, it will be readily appreciated by those of ordinary skill in the art that various changes may be made without departing from the spirit and scope of the invention. For example, in certain embodiments, the handles may be attached along the longer surfaces of the baking sheet's cooking surface. As another example, the rods may be positioned along the sheet in a different manner, such as crossed, and additional rods can be utilized, for example, to provide further enhanced support to the baking sheet.

The various dimensions shown may be modified. For example, the baking sheet may have a square or oval cooking surface or other shape. The baking sheet may also have a non-flat structure, and may include waves or other structural design, and/or other textures, on one side or both sides of the baking sheet. In particular, with a non-flat design, different patterns of air circulation are provided. Still further, connectors used to attach the handles to the rods in various embodiments described may have designs quite distinct from that shown and described. Moreover, the shapes/cross-sections of the various components may be modified. For example, the handles may have square, rectangular, oval or other appropriate cross-section, with, in certain embodiments, connectors adapted to receive such shaped handles/rods. The rods can be flat, rectangular, square, round, oval, triangular, hexagonal or other appropriate shape. In a further variation, the inventiveness of the baking sheet as discussed is applicable to a serving tray. In such case, the serving tray is similar in appearance to the cooking surface shown in the figures.

As mentioned above, the handles in certain embodiments preferably are manufactured from thermo-resistant material. Each of the connectors may be made from any appropriately strong material suitable for cooking applications. The connectors likewise preferably are made from thermo-resistant material. Each of the rods may be made from stainless steel or appropriately strong thermo-resistant material. The handles and rods can be made from the same material, thus providing tension strength to both the frame and sheet. Given the particular design of the baking sheet of the present invention with the preferred thermo-resistant components mentioned, the baking sheet advantageously allows users to make contact with the baking sheet's handles shortly, if not immediately, after exposure of the baking sheet to various cooking temperatures. This advantageous feature in turn allows the removal from an oven or other heat source of the baking sheet using the handles and without the need for the use of oven mitts or other protective device.

The baking sheet of the present invention in certain embodiments further provides for a design that enables a user to partially or fully remove the handles. Partially removing the handles, as discussed above, allows the baking sheet to be conveniently slid, moved or rolled into storage when needed. The handles and connectors may also be fully removed to allow for easy cleaning of the various components as well as easy storage. In particular, the baking tray can be stored in close proximity to other baking trays (even those not embodying the present invention) without wasting space needed for the handles. The handles can also be removed prior to baking and then be re-attached to the sheet while it is still in the oven to allow easy "cold-handle" removal of the sheet. The baking sheet therefore may be utilized without the handles and, if desired, handles can be attached to provide easy handling.

In addition, the flexibility of having removable connectors and handles allows for the easy replacement of such components as needed. Handles of various shapes, styles and sizes can be utilized based upon cooking styles, personal preferences and other desires of users. Multiple pairs of handles can be utilized with a single baking sheet, with the user selecting the particular pair of handles to be used based upon whatever factors the user considers. It is further possible to provide different sets of connection ends for the connectors for use with different shaped/sized handles.

Therefore, it is intended that the appended claims be interpreted as including the embodiments described herein, the alternatives mentioned above, and all equivalents thereto.

What is claimed is:

1. A baking sheet, comprising:
   a flat square or rectangular silicone cooking surface, the flat cooking surface being the sole cooking surface of the baking sheet;
   first and second support rods for supporting the flat silicone cooking surface, the first and second support rods being coplanar with the flat silicone cooking surface;
   first and second thermo-resistant removable handles coupled to the first and second support rods,
   the first and second thermo-resistant handles being slightly curved to provide tensile strength to both the first and second rods and to the cooking surface,
   the tensile strength provided to the cooking surface by the curve of the first and second thermal-resistant handles maintaining a substantial portion of the cooking surface flat and coplanar to the first and second support rods.

2. The baking sheet of claim 1, wherein the silicone cooking surface is substantially round in shape and each of the first and second support rods are curved and are disposed along different parts of a perimeter of the silicone cooking surface.

3. The baking sheet of claim 2, wherein each of the first and second thermo-resistant handles are curved and coupled to the first and second rods so that each of the first and second handles extend along respective planes that are substantially perpendicular to a plane through which the silicone cooking surface extends, the handles stretching the cooking surface.

4. The baking sheet of claim 1, wherein the silicone cooking surface includes a plurality of openings adapted to allow heat flow through the openings during heating of the baking sheet.

5. The baking sheet of claim 1, wherein the silicone cooking surface has a thickness that is sufficiently strong and sufficiently stretched between the first and second rods when the baking sheet is both cool and heated during food cooking conditions.

6. The baking sheet of claim 1, wherein each of the first and second handles is comprised of non-food grade material.

7. The baking sheet of claim 1, wherein each of the first and second handles is comprised of non-food grade material with a silicone coating.

8. The baking sheet of claim 1, wherein the silicone cooking surface has a thickness of substantially between 0.5 mm and 2.0 mm.

9. The baking sheet of claim 1, wherein the silicone cooking surface is intermixed with at least one of fiberglass threads and fiberglass fabric and reinforcement thermo resistant material.

10. The baking sheet of claim 1, wherein the entire baking sheet is thermo resistant to a minimum of 180 Celsius.

11. A baking sheet, comprising:
    a substantially round flat silicone cooking surface, the flat cooking surface being the sole cooking surface of the baking sheet;
    first and second support rods for supporting the silicone cooking surface and disposed on substantially opposite ends of the round silicone cooking surface, the first and second support rods being coplanar with the flat silicone cooking surface;
    first and second thermo-resistant handles coupled to the first and second support rods,
    the first and second thermal-resistant handles being slightly curved to provide tensile strength to both the first and second rods and to the cooking surface, and
    the tensile strength provided to the cooking surface by the curve of the first and second thermal-resistant handles maintaining a substantial portion of the cooking surface flat and coplanar to the first and second support rods.

12. The baking sheet of claim 11, wherein each of the first and second support rods and the first and second handles provide sufficient structure to properly support and stretch the round silicone cooking surface.

13. The baking sheet of claim 12, wherein the round silicone cooking surface is stretched sufficiently from the first and second support rods so as to remain sufficiently flat during use of the baking sheet.

14. A baking sheet comprising:
    a flat cooking surface, the flat cooking surface being the sole cooking surface of the baking sheet; and
    a support device disposed along a periphery of the flat cooking surface and adapted to secure an extension of the cooking surface,
    the support device being coplanar with the flat silicone cooking surface and being comprised of a plurality of rods and thermal-resistant handles,
    the plurality of thermal-resistant handles being slightly curved to provide tensile strength to the plurality of rods and to the cooking surface, and
    the tensile strength provided to the cooking surface by the curve of the plurality of thermal-resistant handles maintaining a substantial portion of the cooking surface flat and coplanar to the plurality of rods.

15. The baking sheet of claim 14, wherein the support device is a rod disposed along the periphery of the cooking surface.

* * * * *